J. A. FULKS.
ANIMAL TRAP.
APPLICATION FILED JUNE 26, 1911.
1,011,605.
Patented Dec. 12, 1911.
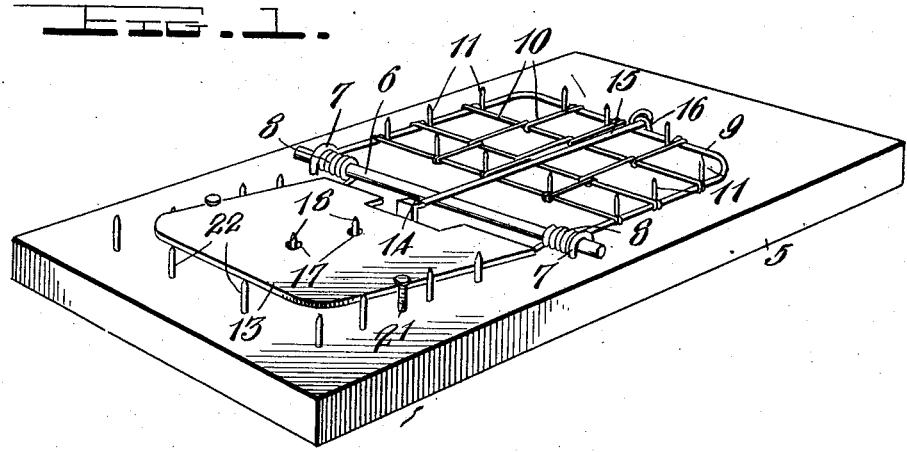
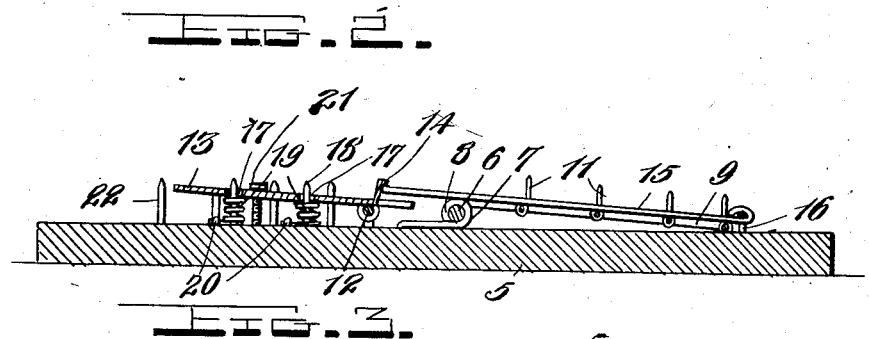
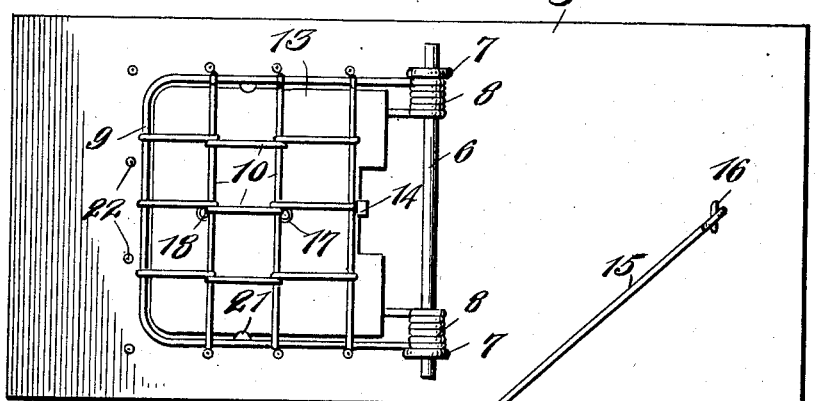
Witnesses
Chas. L. Griesbauer.
L. J. Ellis.
Inventor
J. A. Fulks,
By Watson E. Coleman,
Attorney

UNITED STATES PATENT OFFICE.

JACOB A. FULKS, OF WATER PROOF, LOUISIANA.

ANIMAL-TRAP.

1,011,605.   Specification of Letters Patent.   Patented Dec. 12, 1911.

Application filed June 26, 1911. Serial No. 635,278.

*To all whom it may concern:*

Be it known that I, JACOB A. FULKS, a citizen of the United States, residing at Water Proof, in the parish of Tensas and State of Louisiana, have invented certain new and useful Improvements in Animal-Traps, of which the following is a specification, reference being had to the accompanying drawings.

This invention relates to animal traps and has for one of its objects to provide a device of this character which is capable of catching or trapping birds, rats and mice or wild animals of various species.

Another object of the invention is to provide a trap for the above purpose which may be easily and quickly adjusted and which is adapted to be used with or without a suitable bait, means being provided whereby the victim is instantly killed upon the springing of the trap.

A further object of the invention is to provide a trap of simple and novel construction whereby animals of various sizes and weight may be trapped therein, the construction of the trap including means to prevent its operation by other animals than those for which the trap is prepared.

With the above and other objects in view, the invention consists of the novel features of construction, combination and arrangement of parts hereinafter fully described and claimed, and illustrated in the accompanying drawings, in which—

Figure 1 is a perspective view of a trap embodying my improvements showing the same set; Fig. 2 is a longitudinal section; and Fig. 3 is a top plan view of the trap after the same has been sprung.

Referring in detail to the drawing 5 designates a base which is preferably in the form of a heavy slab or block of wood to which suitable anchoring means, (not shown) may be attached to retain the trap in position. Upon this base a rod 6 is rigidly held in the eyes 7 which are secured in the base. Upon the rod 6 between the eyes and adjacent to the same, the coiled springs 8 are arranged, one of the ends of said springs being rigidly fixed upon the base, and the intermediate portion of the wire from which said springs are formed is extended to provide a substantially U-shaped jaw 9. To this jaw the intersecting wires 10 are secured, and the extremities of said wires are formed into spurs 11 which project upwardly from the jaw when the trap is set and are adapted to pierce the body of the animal caught in the trap as will be more fully disclosed in the following description.

To the base 5 a pivot rod 12 is rigidly fixed at its ends, said pivot rod being disposed in parallel relation to the rod 6. A trigger plate 13 of substantially the same size and form as the trap jaw 9 is pivotally secured adjacent one of its edges upon this pivot rod. The trigger plate 13 has formed upon its hinged edge and centrally thereof, a vertically disposed catch 14, the end of which is laterally disposed for engagement by the free end of a restraining rod 15 which is pivotally held upon the base at its other end by the loop 16 arranged in spaced relation to the rod 6. The trigger plate 13 is provided with the spaced openings 17 through which the upwardly projecting spikes 18 extend. Upon these spikes between the under side of the trigger plate and the base 5, coiled springs 19 are arranged. The lower ends of these springs are removably attached to the base by inserting the same through the eyes 20 fixed therein. These springs exert an upward pressure upon the trigger plate which is limited by means of the adjustable stops 21 threaded in the base 5 upon opposite sides of the trigger plate, said stops having enlarged heads with the under sides of which the trigger plate engages. A plurality of spikes 22 are also arranged in the base around the edge of the trigger plate, and upon said spikes and the spikes 18 the animal is impaled when the trap is sprung.

In the use of my improved trap, the same is arranged upon the ground at a desirable point which is frequented by the animals to be trapped, and the springs 19 of suitable tension are arranged upon the spikes 18. The stops 21 are adjusted in the base so that these springs can exert their full pressure upon the trigger plate, and the trap jaw 9 is forced down upon the base to the position shown in Fig. 1. The restraining rod 15 is arranged upon the trap jaw and the free end thereof is disposed beneath the laterally extending end of the catch 14 of the trigger plate. When trapping large animals, the trigger plate is covered with brush, no bait being used, but for trapping hawks or other animals for which a suitable bait is required, said bait may be fixed upon the upper ends of the spikes 18. Owing to the arrangement of the springs 19 with relation to the pivotal point of the trigger plate, the tension of the main jaw actuating springs 8 will be insufficient to overcome to any appreciable extent, the action of the springs 19. It will thus be seen that when an animal of the proper size and weight treads upon the trigger plate, the catch 14 will be disengaged from the end of the restraining rod 15 so as to release the trip jaw, whereupon it is forced downward upon the trigger plate between the row of spikes 22 at the outer edge of said plate by the expansion of the springs 8. The spurs 11 pierce the animal's body, and the jaw 9 by its impact with the body of the animal impales the victim upon the upstanding spikes 22 and 18 so that it is immediately killed and all chance of escape prevented. When animals of other size and weight are to be trapped, the stops 21 are first properly adjusted and springs 19 of other tensile strength are arranged upon the spikes 18. For trapping chicken hawks, springs 19 of sufficient strength to prevent the operation of the trap by the weight of a small chicken secured upon the trigger plate would be employed. In the trapping of wild animals, suitable run-ways or guides consisting of sticks and brush may be arranged leading to the trigger plate. Any other desirable means for enticing the animals to the trap may also be employed.

From the foregoing it is believed that the construction and manner of operation of my improved trap will be readily understood.

The device is extremely simple, inexpensive and highly efficient in practical use as it may be readily adjusted for trapping all kinds of animals and birds.

While I have shown a particular form of the jaw and trigger plate which is preferably employed, it will be obvious that these parts may be varied as to form and proportion. It will further be understood that many other minor modifications may be resorted to in the construction and arrangement of the various elements without departing from the essential features or sacrificing any of the advantages of the invention.

Having thus described the invention what is claimed is:—

In a trap, the combination of a base, a spring actuated jaw arranged on said base and carrying a plurality of spurs, a trigger plate pivoted upon the base and opposed to the jaw when the trap is set, said plate having spaced openings formed therein, spikes fixed in the base projecting upwardly through said openings, a spaced row of spikes secured in the base adjacent the edges of the trigger plate, said trigger plate having a catch formed thereon, and a restraining rod arranged on the base to hold the jaw in set position, said rod engaging with the catch of the trigger plate.

In testimony whereof I hereunto affix my signature in the presence of two witnesses.

JACOB A. FULKS.

Witnesses:
 R. D. CALHOUN,
 D. C. STRICKLER.

Copies of this patent may be obtained for five cents each, by addressing the "Commissioner of Patents, Washington, D. C."